May 17, 1966  E. CHOSY  3,251,610
FIFTH WHEEL
Filed June 8, 1964  2 Sheets-Sheet 1
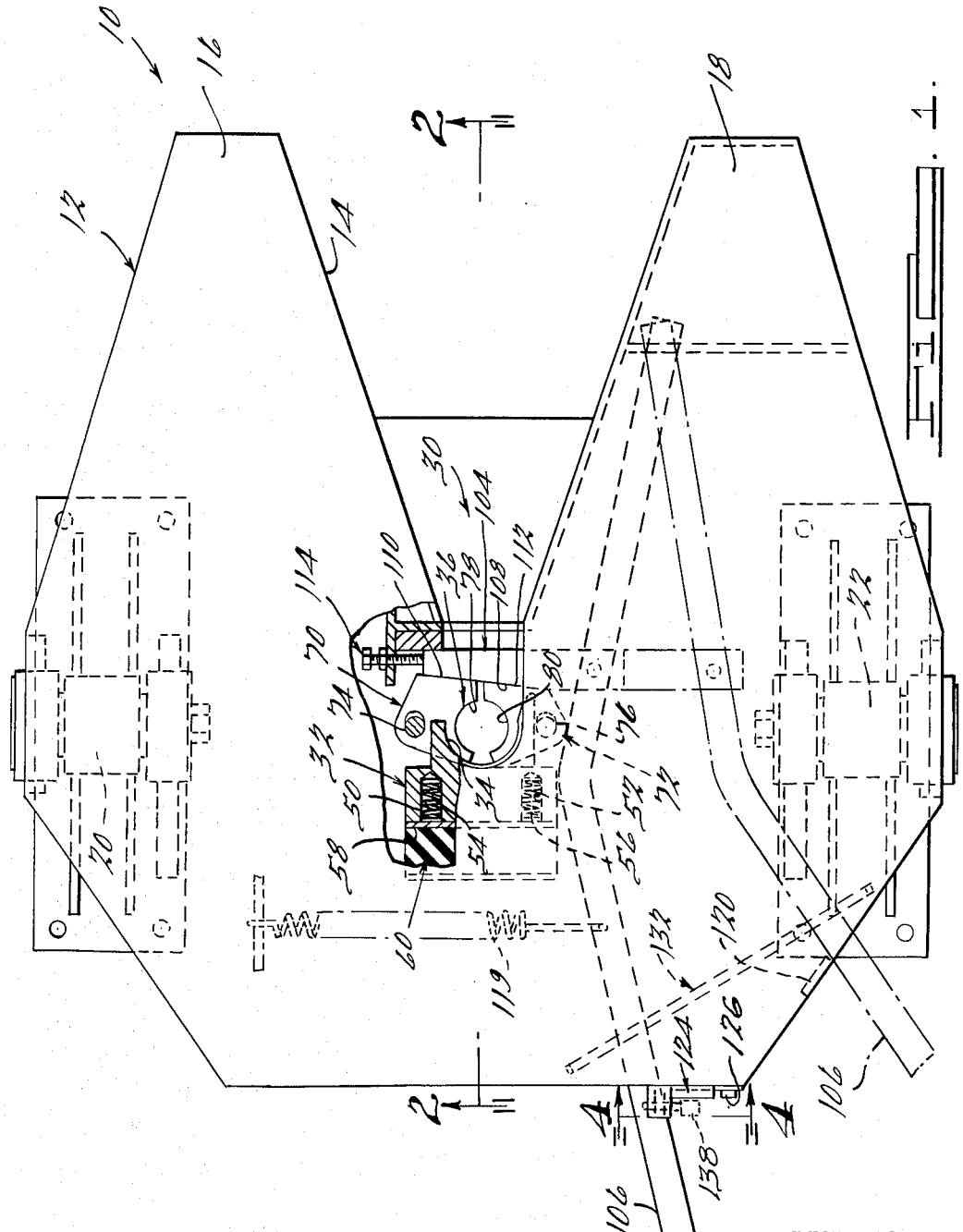
INVENTOR.
Eugene Chosy,
BY
Harness, Dickey & Pierce
ATTORNEYS.

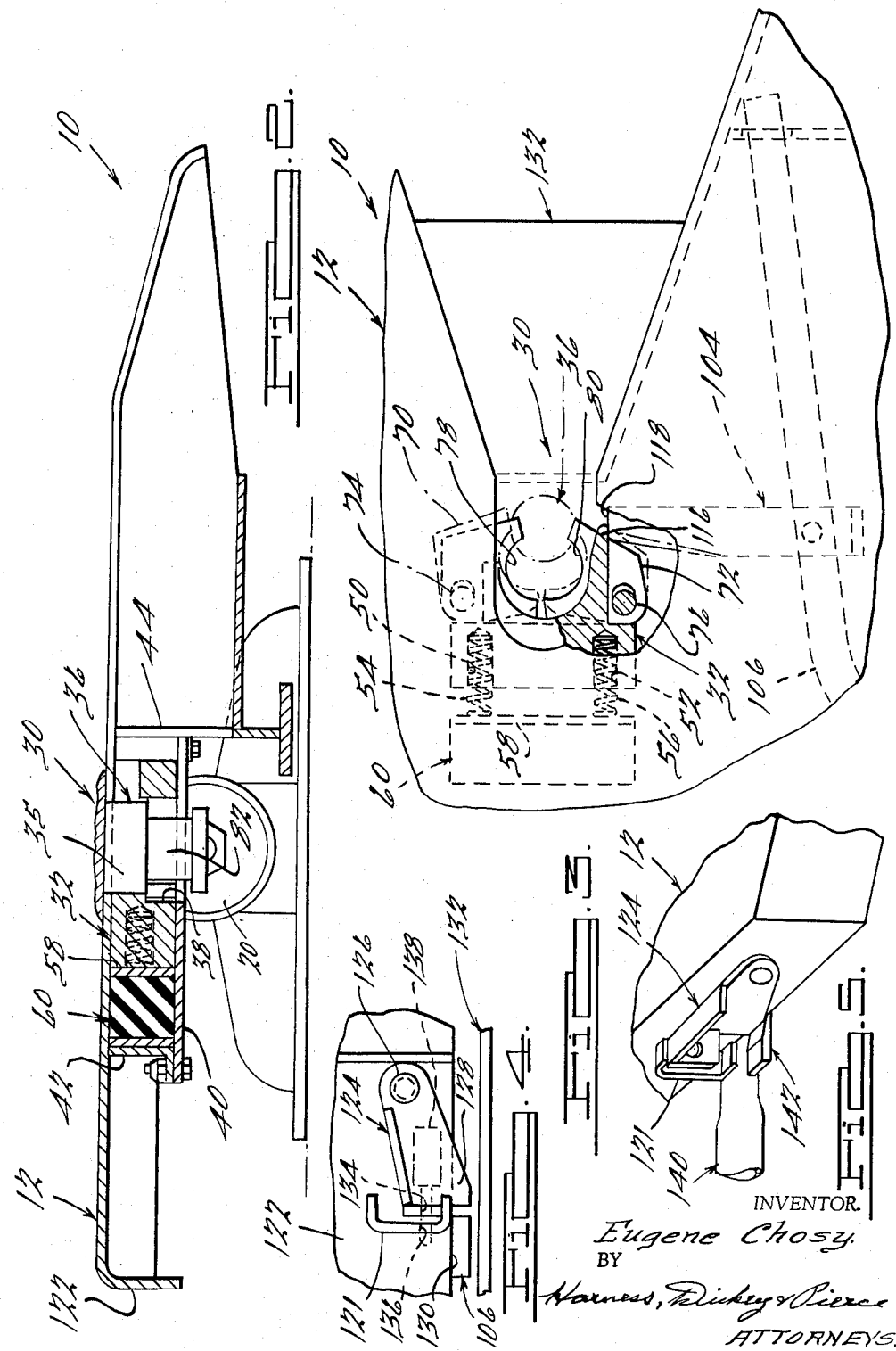

__United States Patent Office__  3,251,610  
Patented May 17, 1966

3,251,610  
FIFTH WHEEL  
Eugene Chosy, Grosse Pointe Farms, Mich., assignor to Fruehauf Corporation, Detroit, Mich., a corporation of Michigan  
Filed June 8, 1964, Ser. No. 373,450  
1 Claim. (Cl. 280—435)

This invention relates generally to fifth wheels and more particularly to an improved kingpin coupler for a fifth wheel.

The kingpin coupler of a fifth wheel is required to transmit not only tractive effort between a tractor and a semitrailer, but also to withstand relatively severe longitudinal shock and vibration due to travel of a trailer over the road as well as to the shock of coupling a kingpin to the fifth wheel.

Kingpin couplers heretofore known and used, while satisfying existing strength requirements, are notoriously subject to wear and premature failure due to cyclical shock and vibration. This problem is solved by the kingpin coupler in accordance with the instant invention which resiliently grips a portion of the kingpin so as to cushion longitudinal movement thereof relative to the fifth wheel so as to absorb longitudinal shock and vibration as well as the shock of coupling.

Furthermore, the kingpin coupler of the instant invention features a top jaw that grips the kingpin on a relatively large diameter thereof and lower jaws that grip a relatively smaller diameter on opposite sides of the kingpin. A locking wedge forces the lower jaws to grip the kingpin tightly and, by adjusting wedge travel, as an adjusting screw, the effects of wear can be eliminated. The lower jaws offer almost a 100% grip on the lower lip of kingpin preventing the kingpin from pulling out vertically. In addition, minimum coupling forces are required to actuate the coupling mechanism.

Accordingly, one object of the instant invention is an improved kingpin coupler for a fifth wheel.

Another object is a kingpin coupler that is relatively easily adjusted for wear.

Another object is a kingpin coupler that maximizes the grip on the kingpin to preclude vertical disassociation of the kingpin from the coupler.

Another object is a kingpin coupler that absorbs the shock of coupling a kingpin thereto.

Another object of the instant invention is a kingpin coupler that requires a minimum coupling force to actuate the coupling mechanism.

Another object is an improved locking mechanism for a kingpin coupler.

Other objects and advantages of the instant invention will be apparent from the following specification, claim and drawings, wherein:

FIGURE 1 is a top plan view, partially broken away, of a fifth wheel having the improved kingpin coupler of the instant invention;

FIG. 2 is a cross sectional view taken substantially along the line 2—2 of FIG. 1;

FIG. 3 is a fragmentary view similar to FIG. 1 with the kingpin coupler in the open condition;

FIG. 4 is a view taken along the line 4—4 of FIG. 1; and

FIG. 5 is a fragmentary perspective view of an extension for the manual operator of the kingpin coupler.

As best seen in FIGURE 1 of the drawings, a fifth wheel 10 comprises a top plate 12 having a generally V-shaped aperture 14 at the rear thereof. Aperture 14 is defined by a pair of rearwardly extending leg portions 16 and 18 the terminal ends of which slope downwardly as seen in FIGURE 2 of the drawings, to effect vertical gathering of a trailer (not shown) relative to the fifth wheel 10. The fifth wheel 10 is pivotally secured to the frame of a tractor (not shown) as by suitable bearings 20 and 22. The foregoing structural elements are conventional in nature.

In accordance with the instant invention, a kingpin coupler generally designated by the numeral 30, comprises a slidable upper jaw 32 having a hemispherical seat or recess 34 therein for the acceptance and engagement of an uppermost portion 35 of a kingpin 36. The uppermost portion 35 of the kingpin 36 has a relatively large diameter, for example, 2⅞ inches.

As best seen in FIGURE 2 of the drawings the upper jaw 32 is relieved along a lower edge 38 thereof so that it can maintain a bias on the kingpin 36, as will be described. The jaw 32 is supported for movement longitudinally of the fifth wheel 10 by a lower support plate 40 which in turn is secured to the top plate 12 by a plurality of vertically extending brackets 42 and 44.

In accordance with one feature of the instant invention the upper jaw 32 is provided with a pair of recessed bores 50 and 52 (FIGS. 1 and 3) into which a pair of helical compression springs 54 and 56 are inserted, respectively. The springs 54 and 56 bear against a plate 58 which in turn bears against a rubber block 60. The rubber block 60 is supported by the lower plate 40 in a manner similar to the jaw 32. The rubber block 60 behind the jaw 32 absorbs longitudinal shock upon coupling of the kingpin 36 as it moves into the coupling mechanism 30 as well as shock due to over-the-road operation, as will be described.

As best seen in FIGURES 1 and 3 the coupling mechanism 30 has a pair of lower jaws 70 and 72 which are supported for rotation about vertical axes by a pair of lower pins 74 and 76, respectively. The lower jaws 70 and 72 have hemispherical recesses 78 and 80, respectively, for the acceptance of a relieved intermediate portion 82 (FIG. 2) of the kingpin 36 having a diameter of, for example, 2 inches. It is to be noted that the holes in jaws 70 and 72 for the pins 74 and 76 are elongated to permit the jaws 70 and 72 to move fore and aft with kingpin 36 when upper jaw 32 moves with the resilient block 60. This also allows for adjustment of slack between kingpin 36, lower jaws 70 and 72 and upper jaws 32.

The jaws 70 and 72 are locked in the closed condition by a locking wedge 104 which in turn is controlled by a manual operator 106. The wedge 104 has a cam face 108 thereon that is engageable with complementary faces 110 and 112 on the jaws 70 and 72 to lock the jaws 70 and 72 in the closed condition. A suitable adjustment screw 114 limits travel of the wedge 104. The upper jaw 32 has a finger 116 thereon that is engageable with an end face 118 on the wedge 104 to lock it in the open condition for a reason to be discussed.

As best seen in FIG. 3, the lower jaws 70 and 72 are angularly related to the direction of movement of the kingpin 36 when in the open condition. The jaws 70 and 72 are biased apart until the kingpin 36 engages the rearmost surfaces of the jaws 70 and 72 so as to bias the jaws 70 and 72 to the position shown in FIG. 1 of the drawings. It is to be noted that movement of the jaws 70 and 72 to the position shown in FIG. 1 effects compression of the springs 54 and 56 and movement of the upper jaw 32 to the left.

When the upper jaw 32 moves to the left, as seen in FIG. 1 of the drawings, the locking finger 116 thereof moves away from the end face 118 on the wedge 104. When the finger 116 clears the wedge 104, the wedge member 104 is movable under the bias of a spring 119 to bring the cam surface 108 thereon into engagement with complementary surfaces 110 and 112 on the lower jaws 70 and 72, respectively, thereby holding the lower jaws 70 and 72 locked about the kingpin 36. This operation can be rendered automatic by clearing the manual operator 106 from a block 120, or, alternatively, can be manually controlled by locking the manual operator 106 behind the block 120 as shown in FIG. 1.

Referring to FIGS. 1 and 4 of the drawings, the fifth wheel 10 is provided with a locking mechanism for the manual operating handle 106. The mechanism comprises a bracket 121 that is secured to a back plate 122 of the fifth wheel 10 as by welding. A latching lever 124 is pivotally secured to the back plate 122 as by a pin 126. The latch 124 has a lower end portion 128 that drops into position below a lower edge face 130 of the back plate 122 to preclude passage of the operator 106 between the plate 122 and a laterally extending manual operator support 132. The latch 124 and bracket 121 have suitable apertures 134 and 136 therein, respectively, for the acceptance of a padlock 138. In order to move the manual operator 106 to the coupler open position the padlock 138 must be removed and the latch 124 rotated upwardly allowing the manual operator 106 to move counterclockwise as seen in FIGS. 1 and 3 of the drawings.

As seen in FIG. 5 of the drawings, handle extension 140 is provided with a wedge block 142 that automatically cams the latch 124 upwardly when the extension 140 is telescoped over the manual operator 106.

Field operation of the kingpin coupler 30 is initiated by cocking the manual operator 106 and wedge 104 to the open condition by rotating the manual operator 106 counterclockwise thereby retracting the wedge 104. With the wedge 104 retracted, the spring loaded top jaw 30 pushes against the lower jaws 70 and 72 to rotate the lower jaws 70 and 72 to an opening of approximately 1⅜". The lever 106 may then be released since movement of the top jaw has placed the top jaw finger 116 into the path of the wedge 104.

The kingpin 36 entering the coupler throat then spreads the lower jaws 70 and 72 open to permit the 2" diameter of kingpin to pass. Spreading of the lower jaws to the open condition moves the wedge 104 back approximately ⅜" to automatically release the operator 106 from block 120 but does not move the top jaw 32.

Upon passing through the 2" opening, the kingpin engages the back surfaces of the C-shaped lower jaws 70 and 72. The foregoing kingpin motion rotates the lower jaws 70 and 72 closed and pushes the top jaw 32 back retracting the top jaw finger 116 from the path of the wedge 104. The spring loaded wedge 104 then slides home and the manual operator 106 is locked in the coupled position by the semi-automatic safety latch 124.

To effect uncoupling, the manual operator latch 124 is released and the spring loaded manual operator 106 is retracted counterlockwise and engaged behind the hold open block 120 on the back plate 122 of the base 12.

Withdrawal of the kingpin 36 rotates the lower jaws 70 and 72, the spring loaded upper jaw 32 following the kingpin 36. Rotation of the lower jaws 70 and 72 moves the wedge 104 back approximately ⅜" which frees the manual operator from the hold open lug on the base. Movement of the upper jaw 32 places the upper jaw finger 116 in the path of the wedge 104 and holds the wedge 104 back. The coupler 30 is now locked open and ready for coupling.

From the foregoing description it should be apparent that the kingpin coupler of the instant invention features a top jaw that resiliently grips the kingpin on a relatively large diameter thereof. The resilient mounting of the top jaw also cushions longitudinal shock loads between the fifth wheel and the kingpin. The kingpin coupler has a pair of lower jaws that grip a relatively smaller diameter of the kingpin on opposite sides thereof in such a manner that retraction of the kingpin is precluded. The kingpin coupler features a locking wedge that retains the lower jaws in the locked condition. The locking wedge is relatively easily adjustable as by an adjusting screw to compensate for the effects of wear.

It is to be understood that the specific construction of the improved fifth wheel herein disclosed and described is presented for the purpose of explanation and illustration and is not intended to indicate limits of the invention, the scope of which is defined by the following claim.

What is claimed is:

A kingpin coupler for securing a kingpin to a fifth wheel, said coupler comprising
    a reciprocable upper jaw engageable with only an upper relatively large diameter portion of the kingpin, said upper jaw having means thereon for retaining a latch in the open condition,
    resilient means for biasing said upper jaw in one direction against the upper portion of the kingpin when said kingpin is in the coupled condition,
    a pair of lower jaws rotatable relative to said upper jaw and engageable about a reduced portion of said kingpin, and
    a releasable latch movable in a direction generally normal to the direction of movement of said reciprocable upper jaw and engageable with said lower jaws for securing said lower jaws in the engaged condition about the reduced portion of the kingpin, said latch being released from said upper jaw upon movement thereof in a direction opposite to said one direction so as to permit said lower jaws to close about the kingpin.

References Cited by the Examiner

UNITED STATES PATENTS

| | | | |
|---|---|---|---|
| 2,429,483 | 10/1947 | Nabors | 280—436 |
| 2,530,311 | 11/1950 | Nabors | 280—436 |
| 2,581,254 | 1/1952 | Greenawalt | 280—434 |
| 2,756,074 | 7/1956 | Kayler | 280—440 X |

FOREIGN PATENTS 1,144,733    4/1957    France.

LEO FRIAGLIA, *Primary Examiner.*